US010732960B2

(12) United States Patent
Kannan et al.

(10) Patent No.: US 10,732,960 B2
(45) Date of Patent: Aug. 4, 2020

(54) SYSTEMS AND METHODS FOR IMPLEMENTING GOLD IMAGE AS A SERVICE (GIAAS)

(71) Applicant: ORACLE INTERNATIONAL CORPORATION, Redwood Shores, CA (US)

(72) Inventors: Lata Kannan, Bangalore (IN); Aneesh Khandelwal, Dublin, CA (US); Mohammed Yunus Qureshi, Santa Clara, CA (US); Rudregowda Mallegowda, Redwood Shores, CA (US)

(73) Assignee: ORACLE INTERNATONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/166,029

(22) Filed: Oct. 19, 2018

(65) Prior Publication Data

US 2020/0125352 A1    Apr. 23, 2020

(51) Int. Cl.
*G06F 9/44*    (2018.01)
*G06F 9/455*   (2018.01)
(Continued)

(52) U.S. Cl.
CPC .................. *G06F 8/65* (2013.01); *G06F 8/60* (2013.01); *G06F 8/61* (2013.01); *G06F 8/63* (2013.01);
(Continued)

(58) Field of Classification Search
CPC ..... G06F 8/71; G06F 8/60; G06F 8/61; G06F 8/65; G06F 8/63; G06F 11/3664;
(Continued)

(56) References Cited

U.S. PATENT DOCUMENTS 9,256,424 B1 * 2/2016 Kuchibhotla ............. G06F 8/71
9,280,335 B2 * 3/2016 Adi ........................... G06F 8/63
(Continued)

OTHER PUBLICATIONS

Luz Fonacier et al., A Practical Guide to Patch Testing, 2015, [Retrieved on Mar. 16, 2020]. Retrieved from the internet: <URL: https://media.proquest.com/media/pq/classic/doc/3800164651/fmt/pi/rep> 8 Pages (669-676) (Year: 2015).*
(Continued)

*Primary Examiner* — Anibal Rivera
(74) *Attorney, Agent, or Firm* — Vista IP Law Group, LLP

(57) ABSTRACT

A computer program product, system, and computer implemented method for generating a software image as a service for deployment by receiving a request for a software image, determining, via a conflict checker, whether conflicts arise between one-off patch updates, a release version of the software and/or RUs, retrieving the release version of the software, and RUs and one-off patch updates that do not have a conflict, installing the release version of the software, the RUs retrieved, and the one-off patch updates retrieved as a test image into a testing environment, testing the test image, upon successful completion of the testing of the test image, formatting the test image into the output format requested, the gold image indicating the test image has been successfully tested and is ready for deployment.

42 Claims, 7 Drawing Sheets

(51) Int. Cl.
  *G06F 21/55* (2013.01)
  *G06F 8/65* (2018.01)
  *G06F 11/36* (2006.01)
  *G06F 8/61* (2018.01)
  *G06F 8/60* (2018.01)
  *G06F 8/71* (2018.01)
  *G06F 21/57* (2013.01)
  *G06F 9/445* (2018.01)

(52) U.S. Cl.
  CPC ............ *G06F 8/71* (2013.01); *G06F 11/3664* (2013.01); *G06F 9/44505* (2013.01); *G06F 9/455* (2013.01); *G06F 21/554* (2013.01); *G06F 21/577* (2013.01)

(58) Field of Classification Search
  CPC ...... G06F 21/554; G06F 21/577; G06F 9/455; G06F 9/44505
  See application file for complete search history.

(56) References Cited

U.S. PATENT DOCUMENTS

| | | | | |
|---|---|---|---|---|
| 9,665,366 | B2* | 5/2017 | Kuchibhotla | G06F 8/71 |
| 2009/0043890 | A1* | 2/2009 | Noonan, III | G06Q 10/00 709/225 |
| 2009/0300641 | A1* | 12/2009 | Friedman | G06F 11/3664 718/104 |
| 2012/0084769 | A1* | 4/2012 | Adi | G06F 8/63 717/174 |
| 2013/0030858 | A1* | 1/2013 | Gupta | G06Q 10/0631 705/7.23 |
| 2013/0297922 | A1* | 11/2013 | Friedman | G06F 8/63 713/2 |
| 2014/0040887 | A1* | 2/2014 | Morariu | G06F 9/44505 718/1 |
| 2014/0229939 | A1* | 8/2014 | Dias de Assuncao | G06F 8/63 718/1 |
| 2016/0092188 | A1* | 3/2016 | Kuchibhotla | G06F 8/61 717/176 |
| 2016/0092210 | A1* | 3/2016 | Kuchibhotla | G06F 8/71 717/121 |
| 2016/0179840 | A1* | 6/2016 | Dani | G06F 16/24561 707/824 |
| 2016/0197850 | A1* | 7/2016 | Peng | H04L 41/5003 709/226 |
| 2016/0350098 | A1* | 12/2016 | Kuchibhotla | G06F 8/65 |
| 2017/0034023 | A1* | 2/2017 | Nickolov | H04L 43/0817 |
| 2017/0116412 | A1* | 4/2017 | Stopel | G06F 21/577 |
| 2017/0116415 | A1* | 4/2017 | Stopel | G06F 21/554 |

OTHER PUBLICATIONS

Neeraj Parolia et al., Conflict resolution effectiveness on the implementation efficiency and achievement of business objective in IT programs: A study of IT vendors, 2015, [Retrieved on Mar. 16, 2020]. Retrieved from the internet: <URL: https://pdf.sciencedirectassets.com/271539/.pdf?> 10 pages (30-39) (Year: 2015).*

* cited by examiner

SYSTEMS AND METHODS FOR IMPLEMENTING GOLD IMAGE AS A SERVICE (GIAAS)

FIELD

This disclosure concerns a method, a computer program product, and a computer system for implementing software deployment.

BACKGROUND

In legacy database installations, database and clusterware applications were distributed as product media (e.g., via CD/DVDs) that may include an installer application to extract the software bits from the product media and install the database and/or clusterware software, hereinafter referred to as the "database software" or "database", onto a designated home directory. Users most often configure the database a few months after their initial purchase of the database such that a number of bug fixes and security patches may have been released in the form of Critical Patch Updates (CPUs), Patchset Security Updates (PSUs), Release Updates (RUs), or Bundle Patches (BPs), all of which are hereinafter referred to as "RUs". RUs are typically released within a time frame such as, for example, quarterly or semi-annually. Database software releases are also typically released within a time frame such as, for example, semi-annually or annually. Users typically use an installer application to install the software and then download the relevant RU(s) to patch the installed software (e.g., via the home directory) with the downloaded RUs, and then proceed with the configuration of the database software. This legacy process was error prone and cumbersome because of the many manual process steps involved with installing the software and applying the patches. There were no permanent solutions to these issues.

To exacerbate the problem, if a particular user customized the database software, the particular user may run into specific software/database issues such as, for example, specific bugs that other users may never run into because of the type of customizations performed by the particular user. In these cases, the software vendor may provide a one-off patch update to fix the specific bug(s) for the particular user and possibly any other users who may have a similar issue/bug in their customized database software. These one-off patch updates are usually not included in the general release of the RU(s) and/or software releases because these one-off patch updates are specifically tailored to particular users that customized the software in a particular way. However, in some cases, it may be determined that some of these one-off patch updates should be incorporated into the general database software release in the form of either a RU or into the general release of the database software itself because although the original issue/bug were deemed to be specific to a particular user, it may be determined later that many other users are affected by similar issues/bugs that the one-off patch update may resolve for the general user base.

However, since the one-off patch updates are usually not incorporated into the general release of the database software or into any RUs, the user must maintain an inventory of the one-off patch updates applied to their specific installation of their database software. When new software releases are available from the software vendor, the user must pay close attention to the new RU releases to know how to manually create new gold images for deployment incorporating the new RUs and/or database software releases along with their inventory of the one-off patch updates. Future database software releases by the vendor may require the user to apply any new RUs to the future database software release, along with any one-off patch updates not incorporated into the new RUs. Maintenance of the list of one-off patch updates and knowing when to apply the one-off patch updates to future database software releases based on whether any of the one-off patch updates have been rolled into the future RUs or future database software releases themselves may become burdensome and very time consuming for each user.

Additionally, the legacy approach required a number of manual interventions with the user having to download the latest RUs available, apply the RUs on the software bits of the base release, double check/investigate if any of the one-off patch updates pertaining to the user has been included in any of the RU(s) and/or database software release, apply the one-off patch updates to the RU(s) and/or software bits of the base release, test the new installation, and then distribute the tested database software installation (e.g., a Gold Image) across their organizations for future use.

The pitfalls in the legacy approach were (1) different mechanisms were used to install the database software releases, RU(s) and/or the one or more one-off patch updates, causing huge inconsistencies (e.g., each database administrator (DBA) has their own script for automating the installation process); (2) DBAs need to monitor the RU releases, as an example, every quarter and build the gold images manually; (3) The existing deployments may have one-off patch updates which may conflict with the new RU, which requires investigation; (4) The one-off patch updates may already be included in a new RU, which also requires investigation; (5) Despite all care, the degree of confidence on the gold images manually created by each customer's DBA was not high; and (6) Home-grown automation scripts of users tend to break because of changing naming conventions provided by the vendor, and new requirements from one RU to another (e.g. new installation utility to be downloaded before a RU may be applied).

Therefore, there is a need for an improved approach to generate a gold image that addresses the above-described problems.

SUMMARY

Embodiments of the present disclosure provide a computer program product, a computer system, and a computer-implemented method for providing customer specific upgrade software images incorporating customer specific one-off patch updates that are specific to each customer. Instead of providing a generic upgraded/updated software version to all customers to have them each individually install and apply release updates and customer specific one-off patch updates to the generic software version, the present disclosure provides a customized version of an upgraded/updated software image to be delivered to each customer by starting with a generic version of the upgraded/updated software and applying relevant customer specific one-off patch updates to generate the customized version of the upgraded/updated software image for deployment to the customer, the customized version of the upgraded/updated software hereinafter referred to as a Gold Image (further disclosed below).

A Gold Image is an image of a tested software installation that is ready for deployment in a testing and/or production environment. Instead of each user/customer manually generating their own gold images for each new software release or release update (RU), the present disclosure discloses systems, computer program products, and computer-implemented methods for generating the customized gold image for each user as a service (e.g., Gold Image as a Service).

The Gold Image as a Service (GIaaS) generates a gold image, based at least in part on inputs (e.g., customer specific one-off patch updates) provided by the users, for each user to quickly and efficiently deploy the newly released software into the user's testing/development/production environments. The GIaaS may eliminate countless hours of DBA time and effort for manually installing, investigating, and testing the new releases of database software, often released on a frequent basis. The gold images produced by the GIaaS are also optimized such that the files and folders installed in the user's home directories have been scrubbed of files and folders that are not needed by the particular user, based at least in part on the user's input when requesting the gold image. For example, the general released software may include many features and functionalities such that many files and/or folders may be associated with such features and functionalities. However, if a particular user's deployment of the software does not include some of the features and functionalities of the general software, the optimized gold image may not include the files and/or folders corresponding to features and functionalities not deployed by the particular user.

The optimized gold image improves the functioning of the computer itself by reducing the amount of disk space required to efficiently and effectively execute the database software using the optimized (e.g., removal of reference paths (RPATH) from binaries to remove potential security vulnerabilities, etc.) gold image generated by the GIaaS. The expertise of the software vendor may now be leveraged to efficiently and effectively generate the gold image for each user so the users individually do not have to manually create their own gold images whenever a new software release is made available by the software vendor.

The GIaaS also improves the technical area of graphical user interfaces (GUI) based on certain elements disclosed in the present disclosure. For example, the GIaaS provides a simple web portal interface for a user to provide input requests specific to generating a particular gold image such as a loader button to load a file comprising a plurality of RU identifiers and/or one-off patch update identifiers for the GIaaS to determine which RUs and/or one-off patch updates to install and which RUs and/or one-off patch updates to not include in the install of the gold image. The GIaaS detects conflicts, builds, validates, and optimizes the gold images. The GIaaS also provides multiple types of output formats (e.g., tar, zip, docker, ova, etc.) for different types of deployment into different types of computing infrastructures. The GUI also provides a status page to query the status of the gold image requests.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings).

DETAILED DESCRIPTION OF THE EMBODIMENTS OF THE DISCLOSURE

Figure 1:
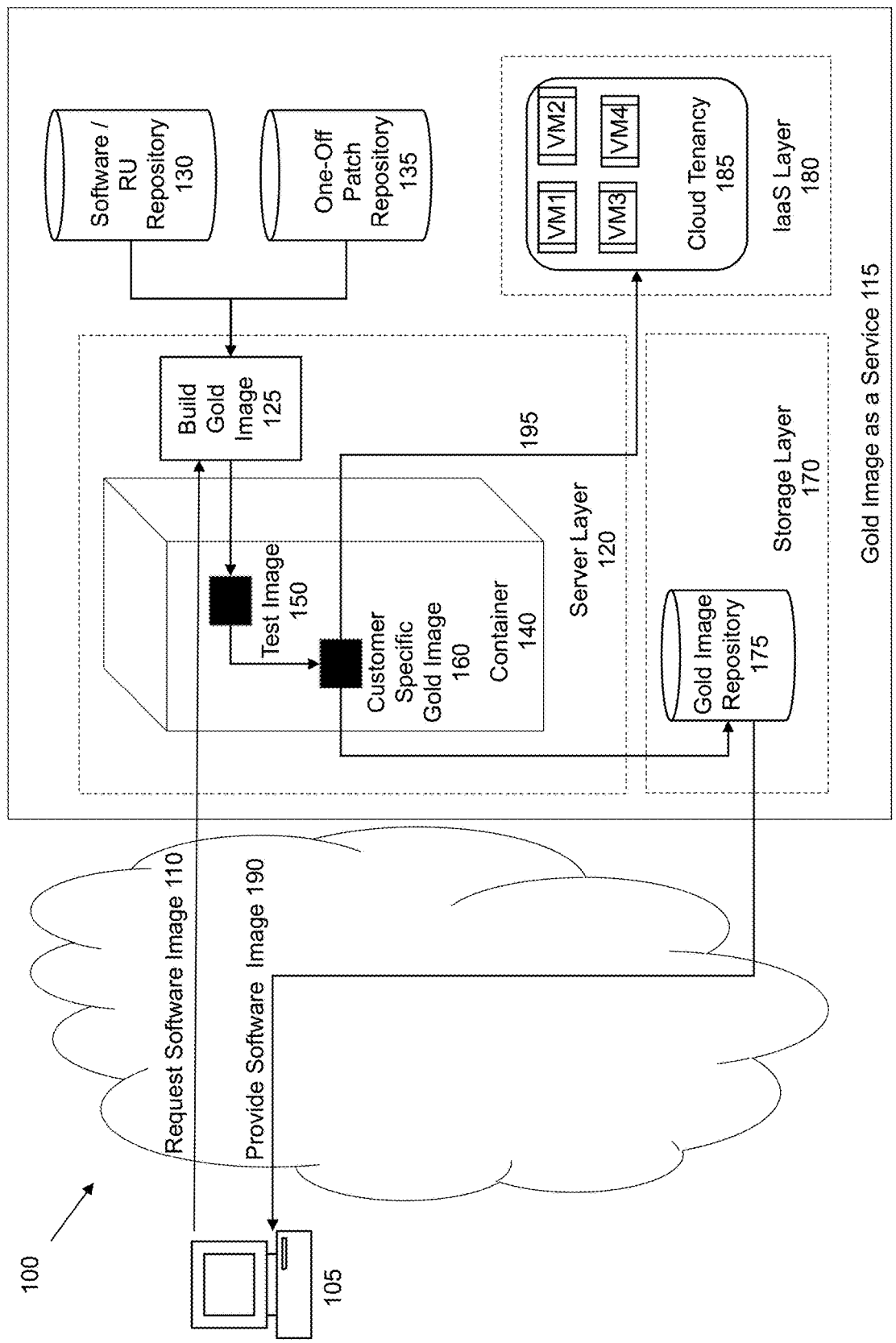
FIG. 1 illustrates a system in which some embodiments of the disclosure are implemented.

Various embodiments are described hereinafter with reference to the figures. It should be noted that the figures are not necessarily drawn to scale. It should also be noted that the figures are only intended to facilitate the description of the embodiments, and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, references, throughout this specification, to "some embodiments" or "other embodiments" suggests that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

The present disclosure provides an improved approach for generating a software image as a service for deployment in a user environment. In particular, the present disclosure provides an approach to have the software vendor provide, as a service, the ability to generate a software image (e.g., gold image, discussed further below) for each of their customers to simply load and run in the respective customer's production environment with minimal testing. Instead of having each customer manually install a version of the new software release in a test/development environment, apply appropriate software patches such as release updates (discussed below) and customer specific one-off patch updates to the new software installed in the test/development environment, test to ensure compatibility amongst the new components, and then fully test before migration to the production environment, the present disclosure short cuts the entire manual software upgrading process performed by each customer by providing a service that will generate a software image (e.g., gold image) based on a request provided by each customer detailing the software version they would like to upgrade to and the one-off patches that they have installed in their current production environment. The customer will receive a gold image from the software vendor to perform a full test to ensure specific features and functionalities are working, and then converting the gold image into the production environment.

This way, the technological area of software upgrades is greatly improved from a manual process performed by each customer on a regular basis, to a service that provides the customized software image by each customer simply providing some input to allow the software vendor to generate the customized software image for each customer. The heavy lifting of patching the new software release may be handled by the software vendor since the software vendor may be in the best position to know which customer specific one-off patches should or should not be applied to the latest release of the software. Furthermore, in some embodiments, the generation of a gold image performed by the vendor of the software may also be automatically rolled into a cloud deployment instance for the customer.

The software image generated, according to some embodiments of the present disclosure, is referred to hereinafter as a "Gold Image." A Gold Image of a software represents the upgraded state of the software having customized configurations of the desired versions of the software, and the desired patches. A Gold Image is expected to undergo revisions whenever a user plans to upgrade the software, or deploy new patches on the software. Each of these sequential revisions of the Gold Image is termed as a Gold Image version. In some embodiments, a Gold Image may be a database image of a tested installation of a particular version of a database software. The tested installation of the particular version of the database software may also include RU(s) and one-off patch update(s) applied to the particular version of the database software.

In legacy approaches, to install either a brand-new database software or upgrade/update an existing installation of the database software, a user would receive a product media such as, for example, CD(s), DVD(s), etc. Included within the CD(s) may be an installer application that extracts/retrieve software contained within the CD(s) and place the software into a particular home directory for the software. In some cases, when there are bug fixes (e.g., patches) made to the version of the database software provided within the CD(s), the user would need to further apply the patches to the installed software to ensure the installed software includes all of the latest bug fixes. The home directory is a file system directory on a multi-application operating system containing files for a given application. For example, an Oracle Home directory is a file directory for storing Oracle related software. The Oracle suite of software is generally installed at the Oracle Home directory.

In the case of a brand-new installation for a user, the user would typically begin to configure and customize the database software to meet the business, functional, and technical requirements of the user after installing the database software into the home directories; along with any RU(s). While customizing the database software, the user may run into bugs/issues with the database software that may require the software vendor to provide a one-off patch update to fix the bugs/issues associated with the particular user's bugs/issues as a result of the user specific customizations. These one-off patch updates are typically specific to the particular user such that they are not usually included in the software vendor's general RUs available to all users. Instead, the list of the one-off patch updates received and used by the user must be maintained by the user so that as new database software releases are made available by the vendors, during the installation of the new release of the database software, the user must apply the one-off patches.

In the case of an existing user already having an instance of the database software running on a production system, the user would typically install the newly released version of the database software or RU(s) from the CD(s) onto a home directory that is not the production system's home directory for testing purposes. If only RU(s) were newly released, then the user would only have to install the newly released RU(s) onto a test system already running the current version of the database software. Additionally, if the user has one-off patch update(s) already installed on the test system running the current version of the database software, the customer's DBA may have to investigate whether or not to apply the one-off patch update(s) on top of the RU(s) because in some cases, one or more of the user's one-off patch updates may have been included within the newly released RU(s). Therefore, the DBA is constantly creating new Gold Images to deploy in the production environment because new RU(s) and/or database software are constantly being released (e.g., quarterly for RU(s) releases and semi-annual or annually for database software releases).

Whether the user is installing the database software for the first time, or the user is upgrading an existing installation with an upgraded version of the database software or RU(s), the entire installation process is typically a manual process. DBAs have tried to automate as much of the installation processes as possible so that the manual portions of the installation process are minimal. However, even the automation scripts are prone to errors because of many different reasons. For example, (1) the vendor may change the file naming standards for the installation files, the file directories, and/or the RU(s) themselves; or (2) the vendor may change the tools used within the installer application.

Since RU(s) are released periodically and frequently (e.g., every 3 months), users struggle to keep up with the frequent release schedule and thus some users avoid patching/upgrading their systems as long as possible. However, avoiding the patching and upgrading of the systems may lead to inefficiencies of the computing system itself because the RU(s) are made available to improve the performance of the computing system itself because the RU(s) generally include bug/issue fixes to improve the overall performance of the computing system. Avoiding the upgrading/updating of the RU(s) because the task of generating new Gold Images of the computing system will definitely affect the performance of the computing system itself. Therefore, the disclosed systems, computer program products and methods solve these problems by offloading the generation of the Gold Image from each customer's DBA to the vendor so that the vendor is providing the Gold Image to each user based at least in part on information received by the user to provide the respective Gold Image to each user. Since the software vendor is the most knowledgeable entity of what is included in a new release of the software and/or RU, it naturally follows that the software vendor would be the best entity for providing a centralized service for generating Gold Images as a service for deployment for their customers/users in a uniform, cost-effective way to deliver optimized software upgrades across users.

FIG. 1 illustrates a system for generating a software image as a service for deployment, according to some embodiments of the disclosure. System 100 includes a computing device 105 in communication with a Gold Image as a Service (GIaaS) 115. The computing device 105 issuing a request 110 for a software image (e.g., a Gold Image).

User computing device 105 may comprise any type of computing station that may be used to operate or interface with the GIaaS 115. Examples of such user computing devices 105 include, for example, workstations, personal computers, laptop computers or remote computing terminals. User computing devices 105 may also comprise any type of portable tablet device, including for example, tablet computers, portable readers, etc. User computing device 105 may also include mobile telephone devices relating to any mobile device that can suitably access any computing systems, as an example, on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate embodiments of this present disclosure may be implemented on the Internet, on a closed network, on a hybrid open and closed network, or on a cloud network, etc. A user and a customer may hereinafter be used interchangeably to broadly refer to a user of the GIaaS as someone who is not an employee of the software vendor. However, in some embodiments, the user referred to within this disclosure may also be an employee/developer of the software vendor such as, an example, a support engineer or a pre-sales technical sales person. Therefore, a user, as referred hereinafter, may be a $3^{rd}$ party user such as a partner of the software vendor, a customer, and/or an employee of the software vendor.

In some embodiments, the request 110 for the software image may be received by GIaaS 115 in the form of a Representational State Transfer (REST) request. REST is an architectural style that defines a set of constraints and properties based on HTTP. Web Services that conform to the REST architectural style, or RESTful web services, provide interoperability between computer systems on the Internet. REST-compliant web services allow the requesting systems to access and manipulate textual representations of web resources by using a uniform and predefined set of stateless operations. In some embodiments, a user may submit the request 110 from a command line. In some embodiments, a user may use a REST request to check the status of the request because when a user makes a REST request to create a Gold Image, the user may have to provide another REST request to check the status of the request to create the Gold Image.

Request 110 for a software image may be a request for generating a gold image, wherein the request may comprise a release version of a software, an output format of the software image, RU identifiers corresponding to RUs from an existing deployment of the software, and/or one-off patch update identifiers corresponding to one-off patch updates of the existing deployment. The software may be an application software and/or a database, or any software that performs a function that may be constantly updated and revised. An application software may be, as an example, Oracle Corporation's E-Business Suite (also known as Applications/Apps or EB-Suite/EBS) which may comprise of a collection of enterprise resource planning (ERP), customer relationship management (CRM), or supply-chain management (SCM) computer applications. A database may be, as an example, Oracle Corporation's Oracle Database. The release version of the software is a publicly available version of the software uniquely identified by the version number and/or name. As software matures and new features are added or new bugs are fixed, a new version of the software may be available. As the new version of the software is made available to the public, the new version of the software is identified based on either the unique number or name. The release version of the software uniquely identifies the particular software version from among a plurality of software versions stored within a software/RU repository 130.

The RU identifiers are unique identifiers to uniquely identify a particular RU from among a plurality of RUs within a patch repository 133. The one-off patch update identifiers are unique identifiers to uniquely identify a particular one-off patch update from among a plurality of one-off patch updates within a one-off patch update repository 136.

GIaaS 115 is a cloud-based service that provides customer specific gold images as a service. Instead of each user manually creating their own gold image of a particular released software version having applicable RU(s) and/or one-off update(s) installed and tested, the GIaaS 115 cloud service provides the gold images for the user based at least in part on input provided by the user (e.g., a DBA of the customer) of the requested software image.

GIaaS 115 includes a server layer 120, a build gold image service 125, a software/RU repository 130, a one-off patch repository 135, a storage layer 170 and an IaaS layer 180.

Server layer 120 is configured as a server-processing layer comprising one or more physical computers and/or servers. Server layer 120 may host a plurality of containers 140 for processing job request such as a request 110 for a software image. Although only one container 140 is illustrated for simplicity purposes, one of ordinary skill in the art may appreciate the server layer 120 may include a plurality of containers 140. Container 140 creates an isolation boundary at an application level rather than at a server level. This isolation means that if anything goes wrong in that single container (e.g., excessive consumption of resources by a process) it only affects that individual container and not the whole server/server layer. A separate container 140 is created to allow each request 110 for a software image to process and run in isolation with respect to other requests 110. In some embodiments, multiple requests for Gold Images may execute in parallel via the separate containers. Container level isolation also allows the system to create the gold images in parallel having the same home path with the standard user and install groups.

Build gold image service 125 is a service module that coordinates and/or executes the building of the customer specific gold image 160 that is delivered to the user/customer. Upon receiving the request 110, a container 140 is provisioned to process the request, wherein the container 140 may already have a base release of the database software. Based on the request 110, the provisioned container 140 proceeds to create a software image by retrieving the requested RU(s) (if any) from software/RU repository 130 and the requested one-off patch updates (if any) from one-off patch repository 135. Next, the build image service 125 installs the retrieved software and patches onto a home directory located within container 140. The software image installed in the home directory is designated as test image 150. The test image 150 is a test image of the installation of the requested software, RU(s) and/or one-off patch update(s) that may be, as an example, specific to a particular customer's deployment, and in some cases, having the customer's specific configuration of the software (e.g., if provided by the customer via request software image 110).

Testing may be performed on the test image to ensure the database software, the RUs, and the one-off patch updates are functioning properly. Upon successful completion of the testing, the test image is designated as/transformed to a customer specific gold image 160. In some embodiments, the test image 150 may be simply designated as a customer specific gold image 160. In other embodiments, test image 150 may be copied to a separate location within container 140 and designated as a customer specific gold image 160. In some embodiments, the test image 150 may be archived, by an archiving utility, into an archive format that may be easily reconstructed/rebuilt/reloaded at a different site (e.g., the customer's site). In some embodiments, depending on an output type requested, the customer specific gold image 160 may be converted to the output type requested and stored within gold image repository 175 within the storage layer 170 for the user/customer to download and install into a home directory of a server of the user, which will be further discussed below. In some embodiments, the output type may correspond to a cloud hosted format (e.g., opc host/OCI Classic, bmc host/OCI, ova—virtual box, ova-ravello, ova-hosted, etc.), at which point, at 195 for example, a VM within cloud tenancy 185 may be provisioned to host the customer specific gold image 160.

Software/RU repository 130 is a storage repository that stores release versions of a database software, RU(s). When a vendor releases a software having a particular version, the software with the particular version is stored in software/RU repository 130 for access by any process that needs to retrieve a particular released version of the software. Software/RU repository 130 may store multiple versions of multiple software applications and multiple databases. Each database software may be uniquely identified by a version number (e.g., a base release number). As the vender release update(s) (e.g., RU(s)) to the public, the actual RU(s) are stored in the software/RU repository 130. Individual RUs may be identified by a RU identifier. In some embodiments, the RU identifier may comprise a version number corresponding to the base release number and a release date of the RU. The software/RU repository 130 may be queried to return the actual software code for installing the respective database software application, RU(s).

One-off patch repository 135 is a storage repository that stores one-off patch update(s) that may have been developed specifically for certain customer(s) based on specific needs of the certain customer(s) that may not be required for the general customers. As the vender release a one-off patch update to a particular user/customer, the actual one-off patch update is stored in the one-off patch repository 135. Individual one-off patch updates may be identified by one-off patch update identifiers. One-off patch updates are bug fixes/patches provided by the vendor for a particular user to fix an issue/bug identified by the particular user. Typically, the particular user is customizing or configuring the database/software in a particular way that most other users are not doing. This is why the bug/issue identified by the particular user is typically applicable only to that user. However, there may be situations where another user may run into the same issue/bug while configuring their database in another way, but the issue/bug may be the same. In this case, the other user may be provided with the same one-off patch update to solve that other user's issue/bug.

As discussed above, one-off patch updates may be made generally available to all users when it is determined that the one-off patch updates may solve issues that are applicable to the general customer base. But, one-off patch updates are usually provided to a user on an as needed basis only, as opposed to being included in a general release of, as an example, a RU or a database software release to all users. However, there are situations when a one-off patch update may be determined to be applicable to more than just a few users.

For example, a one-off patch update to fix a bug/issue discovered by a particular user may be determined to be applicable to the general public. In this example, the vendor may elect to include the one-off patch update in the next RU release or the next database software release available to the general public. In this case, the one-off patch update may no longer be needed to be applied separately to the newest database software release or the newest RU release. When the one-off patch update is included in the next release of the database software, the particular user(s) who were using the one-off patch update must be aware of this inclusion of the one-off patch update into the general available database software so that the one-off patch update is not applied onto the newest release which may already include the one-off patch update. If the particular user(s) fail to remove the one-off patch update from being applied to the newest release, a conflict may occur because the application of the one-off patch update that is in conflict may create issues such as, for an example, a duplication of code or a duplication of code that may perform a function slightly different between when the code was a one-off patch update and when the code was included in the RU/general release of the software. In some embodiments, the software/RU repository 130 and the one-off patch repository 135 may be stored within a same storage repository instead of as two separate repositories (e.g., 130 and 135).

Storage layer 170 is a cloud storage layer comprising one or more gold image repositories 175. Gold image repository 175 is a storage repository for storing gold images created based on requests 110 for database software images. Although only one gold image repository 175 is depicted in FIG. 1, one of ordinary skill in the art may appreciate there may be one or more gold image repository 175 for storing the generated gold images. In some embodiments, each gold image may be stored in its own gold image repository 175. In some embodiments, gold images having different output format types may be stored within gold image repositories 175 by output format types, wherein each output format type may correspond to a separate gold image repository 175.

IaaS layer 180 is an infrastructure as a service (IaaS) layer. The IaaS layer is an online service that provide high-level APIs used to various low-level details of underlying network infrastructure like physical computing resources, location, data partitioning, scaling, security, backup etc. A hypervisor, such as, as an example, Oracle VirtualBox or Oracle VM runs the virtual machines as guests. Pools of hypervisors within the cloud operational system can support large numbers of virtual machines and the ability to scale services up and down according to users' varying requirements. Cloud tenancy 185 is a multi-tenant cloud service platform provided by, as an example, the vendor. Cloud tenancy 185 is a software architecture in which a single instance of software, for example a database software, runs on a server and serves multiple tenants. A tenant is a group of users who share a common access with specific privileges to the software instance. With a multi-tenant architecture, a software application is designed to provide every tenant a dedicated share of the instance—including its data, configuration, user management, tenant individual functionality and non-functional properties.

Multi-tenancy contrasts with multi-instance architectures, where separate software instances operate on behalf of different tenants.

Figure 2:
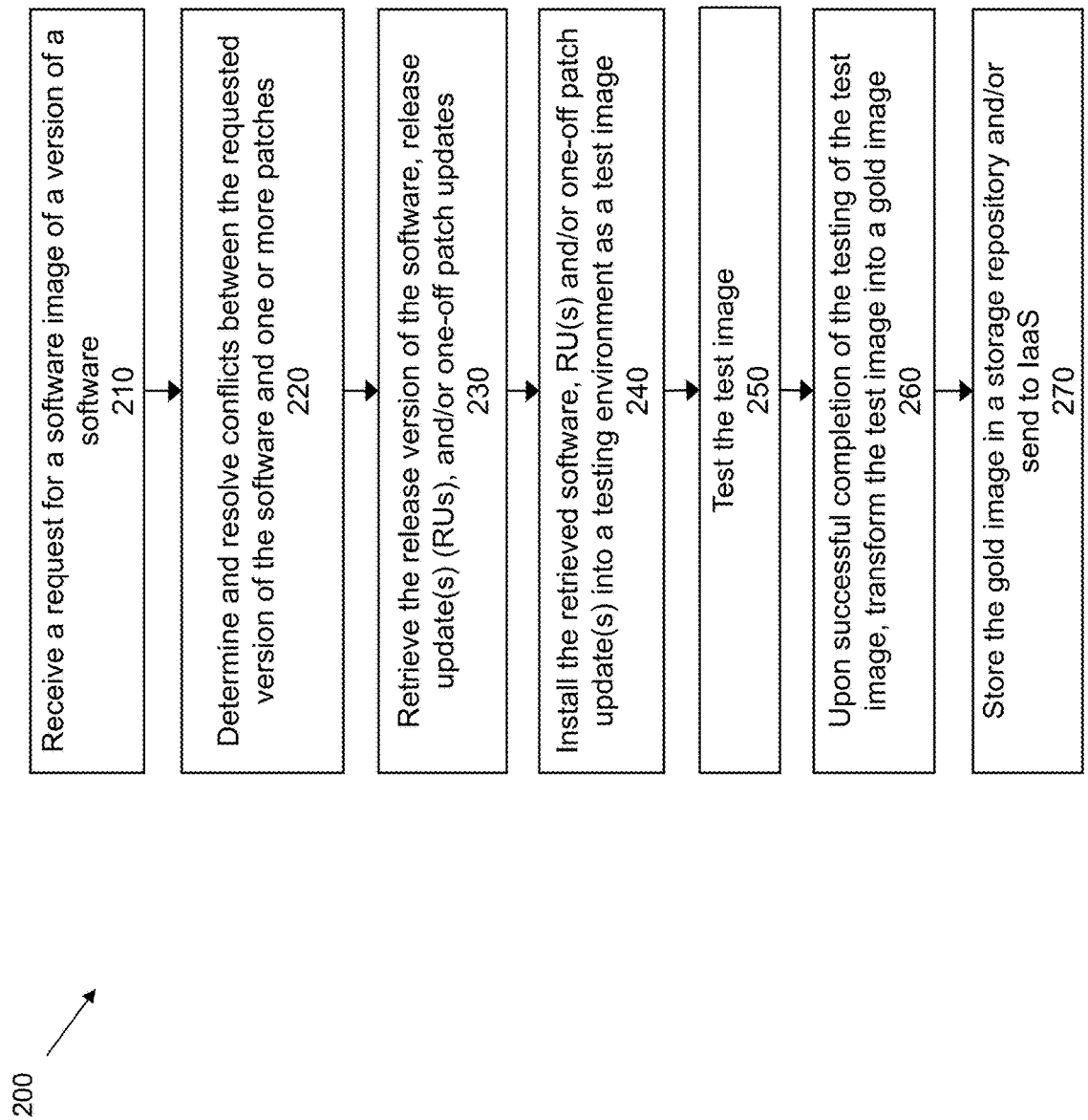
FIG. 2 is a flowchart generating a software image for deployment, according to some embodiments of the disclosure.

FIG. 2 is a flowchart generating a software image for deployment, according to some embodiments of the disclosure. Method 200 includes the steps to generate a software image from a request for the software image, according to some embodiments of the present disclosure. Method 200 will be disclosed with references made to various elements of FIG. 1.

At 210, a request for the software image is received by the GIaaS 115. The request may include a base release version of a database, an output format of the requested software image (e.g., gold image), RU identifier(s) corresponding to RU(s) from an existing deployment of the database, and one-off patch update identifier(s) corresponding to one-off patch update(s) from the existing deployment of the database. In some embodiments, the existing deployment of the database may comprise a prior version of the database software deployed in a test and/or production environment of an existing user/customer.

In some embodiments, the base release version of the database may be a newly released version of the database software. In other embodiments, the base release version of the database software may be the same version as the version currently installed at a customer's site because the new release of database software provided by the vendor may only include the quarterly RU release, as opposed to a new version release of the database software.

The output format type requested may be a format type selected from a list of output format types such as, for example, zip, tar, docker, ova—virtualbox, opc host/OCI Classic, bmc host/OCI, etc. The output format type not only indicates how the gold image should be packaged for delivery to the user/customer, but in some embodiments, (e.g., ova—virtualbox) how and where the gold image should be deployed for a cloud tenant using the database software as a cloud-based application (e.g., as a VM running within a cloud tenancy 185 on an IaaS layer 180 as depicted in FIG. 1).

The RU identifiers uniquely identifying which RUs have already been installed at the customer's site for the corresponding base release version requested.

At 220, a conflict checker determines whether conflicts arise between the one-off patch updates (identified as one-off patch update identifiers), the release version of the software, and/or the RUs (identified as RU identifiers). The conflict checker makes sure the one-off patch updates and the RUs are not conflicting amongst each other and/or the base release version of the software. A conflict may exist, for example, if the vendor had determined that a particular one-off patch update should be included in either the general release of the RU or the base release version of the database software, and the request included the particular one-off patch update to be applied. Because the particular one-off patch update has already been included in the general release of the RU or the base release version of the database software, applying the one-off patch update in addition to installing the general release of the RU and/or the base release version of the software may result in a duplication of code. Therefore, the conflict checker may resolve the conflict (if any) by removing any conflicted one-off patch update(s) and/or RU(s) from the list of requested one-off patch update(s) and/or RU(s) to be included in the building/creation of the test image that will eventually be converted to the gold image.

In some embodiments, there may be a conflict resolved patch that may need to be downloaded for installation that may resolve a potential conflict between one or more one-off patch update with one or more RU(s) and/or the base version of the database software requested. If this is the case, the conflict resolved patch may be downloaded and installed during the build of the test image (e.g., test image 150 from FIG. 1). Since the conflict check is being managed and conducted by the GIaaS—and not by the individual users/customers themselves, many potential issues and errors relating to a manual creation of the gold images by a user/customer may be avoided, thus improving the technical area of deploying new versions of software to an existing deployment of the software.

At 230, the requested base release version of the software and the RU(s) are retrieved from the software/RU repository 130. Additionally, the requested one-off patch update(s) are retrieved from the one-off patch repository 135. As discussed above, only the one-off patch update(s) and RU(s) that were not found to be in conflict by the conflict checker are retrieved. The one-off patch updates and/or RU(s) that were found to be in conflict may be resolved by either removing the conflicted patches from the list of requested one-off patch updates and/or RU(s), or in some embodiments, the list of one-off patch updates and/or the list of RUs is updated to remove the conflicted one-off patch updates and/or RUs determined by the conflict checker from step 220. In some embodiments, a resolution patch (e.g., the conflict resolved patch) may be retrieved to fix a conflict identified by the conflict checker if it is determined that a resolution patch exists to fix the conflict. In some embodiments where a conflict is detected, a search for resolution may be performed using a conflict checker API(s). If an appropriate resolution is found, the same is downloaded and applied. If no resolution is found, then a request for resolution may be filed using the conflict checker API(s).

At 240, the retrieved software, RU(s) and/or one-off patch update(s) are installed into a home directory within a container 140. The installed image at the home directory may be designated as a test image 150.

At 250, the test image 150 is tested to ensure the installed software, along with the RUs and/or one-off patch updates are functioning properly. For example, there may be two types of tests performed. (1) RU validations may be executed after a RU is applied. RU validations may include checking for missing files, incorrect sizes, incorrect permissions, unnecessary debug mode on in libraries, etc. (2) Image validations may be executed after the final gold image is create by cloning the final gold image to a new home directory having a database instance created from the final gold image to verify if a database instance created is successfully created. If cloning or DB creation fails, the final gold image is considered bad.

Upon successfully completing the testing of the test image, the test image is transformed into the requested format at 260. For example, if the output type requested is a zip file, then the home directory of the test image may be zipped up into a zip file for a user to unzip onto a user's home directory for testing within the user's environment before deployment. As another example, if the output type requested is a tape archive (e.g., tar) format, then all of the files starting from the home directory of the test image is archived into one archived .tar file for deployment. Yet as another example, if the output type requested is a .ova file, wherein a .ova file is a virtual appliance used by virtualization applications such as, as an example, Oracle VM Virtualbox developed by Oracle Corporation, then all of the files starting from the home directory of the test image is archived/transformed into the .ova file format. The .ova file is saved in the Open Virtualization Format (OVF), which is a standard format used to package and distribute software that is run in virtual machines. The .ova files are simply an OVF directory saved in a single archive using .TAR packaging for distribution purposes. The test image is converted into a .ova file to be deployed on virtual machines such as, an example, VM1, VM2, VM3, and/or VM4 as illustrated within cloud tenancy 185 within the IaaS layer 180 of FIG. 1.

At 270, the output format is stored as a gold image in the storage repository 175 of storage layer 170. Although in most cases, the gold image is a customer specific gold image. However, the stored gold image may be used for requests from other users/customers that may include the exact same input(s) (e.g., the same requested software version, the same RU(s), the same one-off patch update(s)). For example, if two users request the same release version of the same software, provide the same RUs, the same one-off patch updates, and the same output type, then the gold image generated will be the same for both users. Therefore, whenever a unique gold image is generated, it is saved in the storage layer for future retrieval and reuse if another identical request is received. This way, the gold image does not have to be recreated a second time because it had already been previously created and thus, may be reused. This feature greatly improves the processing of the computer itself because instead of processing an exact same request to generate an exact same output, the systems and methods of the present disclosures simply retrieves the gold image from the storage layer if there is a gold image that was previously generated using the exact same input, thus a new gold image does not have to be created, tested and packaged for deployment.

In some embodiments, a released RU may be reuploaded due to various reasons. The stored gold images are regenerated in those cases where a RU specified may have been reuploaded. This is done by timestamp comparison of the stored image and the reuploaded RU. For example, if user A provided x, y, z inputs, the system would generate a gold image K at date 1. However, at a later date 3 another user B provides the same input x, y, z inputs, the system would retrieve gold image K provided to user A at date 1. However, if at date 2, wherein date 2 is chronologically after date 1 but before date 3, a patch update is made to the gold image K, a new gold image L would be re-uploaded to replace gold image K. Thus, when user B provides the same inputs x, y, z to generate a gold image, the system may first determine that image K should be sent to the user. But, the system may also determine that based on a time stamp comparison of the stored image K vs the reuploaded RU image L, the user should be receiving the reuploaded RU image L with the various user specific one-off updates applied to generate a new image K. In some embodiments, the GIaaS is integrated to use containers for gold image regeneration.

In some embodiments, the output format may be optimized such that certain files, as an example certain log files, may be removed from the home directory that may not be used by a particular user so that, the zipped home directory of the gold image includes a smaller set of files than a standard home directory manually created by a user. The zipped home directory of the gold image will only contain the files necessary for the Gold Image as specified by the particular user request. In other words, this optimization feature improves the functioning of the computing system itself by reducing the footprint of disk/storage space required for the home directory of the gold image generated by the present disclosure as compared with a home directory of a manual installation performed by the user using legacy approaches.

In some embodiments, the gold image may be sent to a cloud service for execution in a computing device at the cloud service. For example, the generated customer specific gold image may be deployed on a virtual machine running in a cloud tenancy 185 of an IaaS layer 180 as depicted in FIG. 1.

Figure 3A:
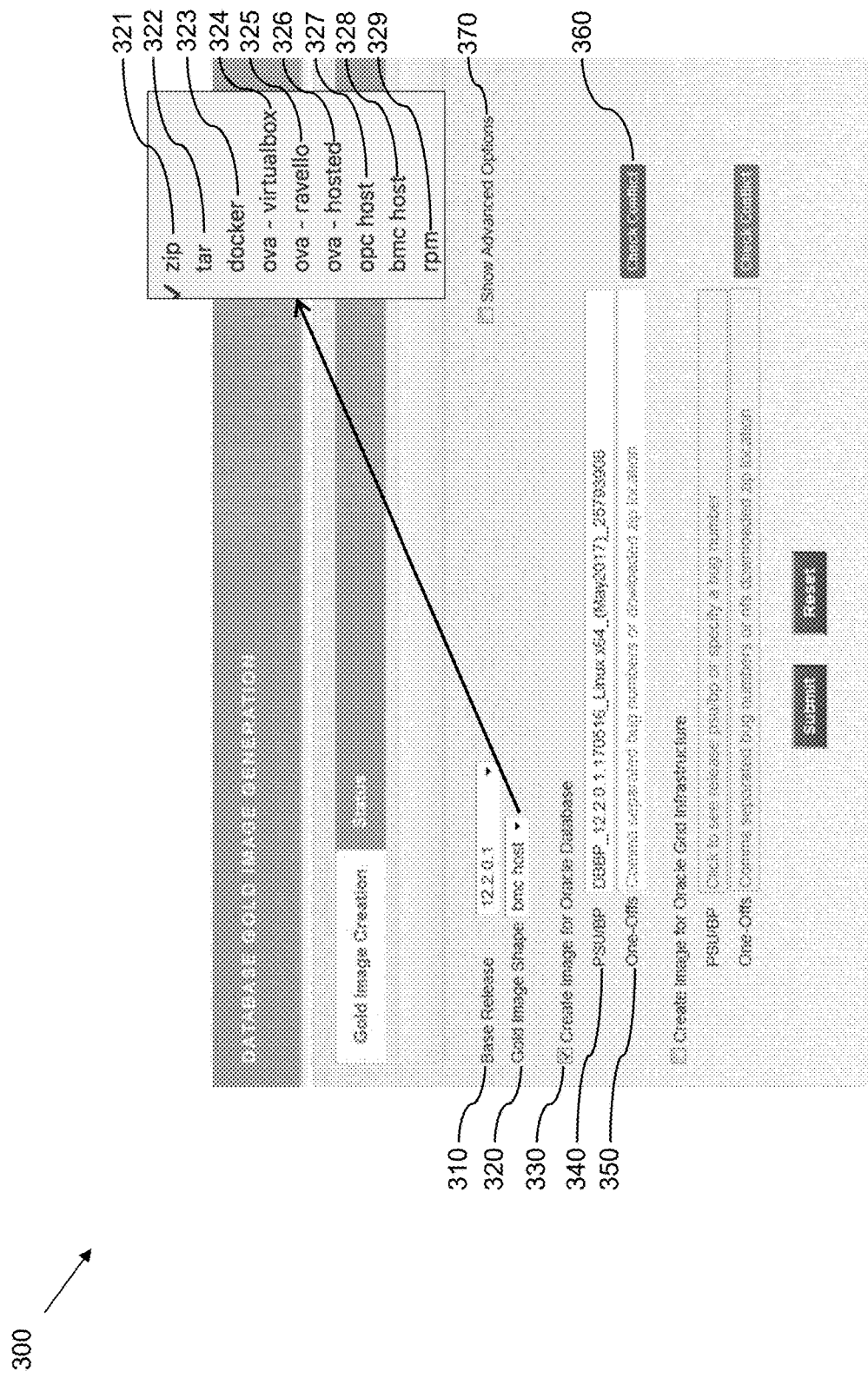
FIGS. 3A-3B illustrate graphical user interfaces for requesting a software image for deployment, according to some embodiments of the disclosure.
Figure 3B:
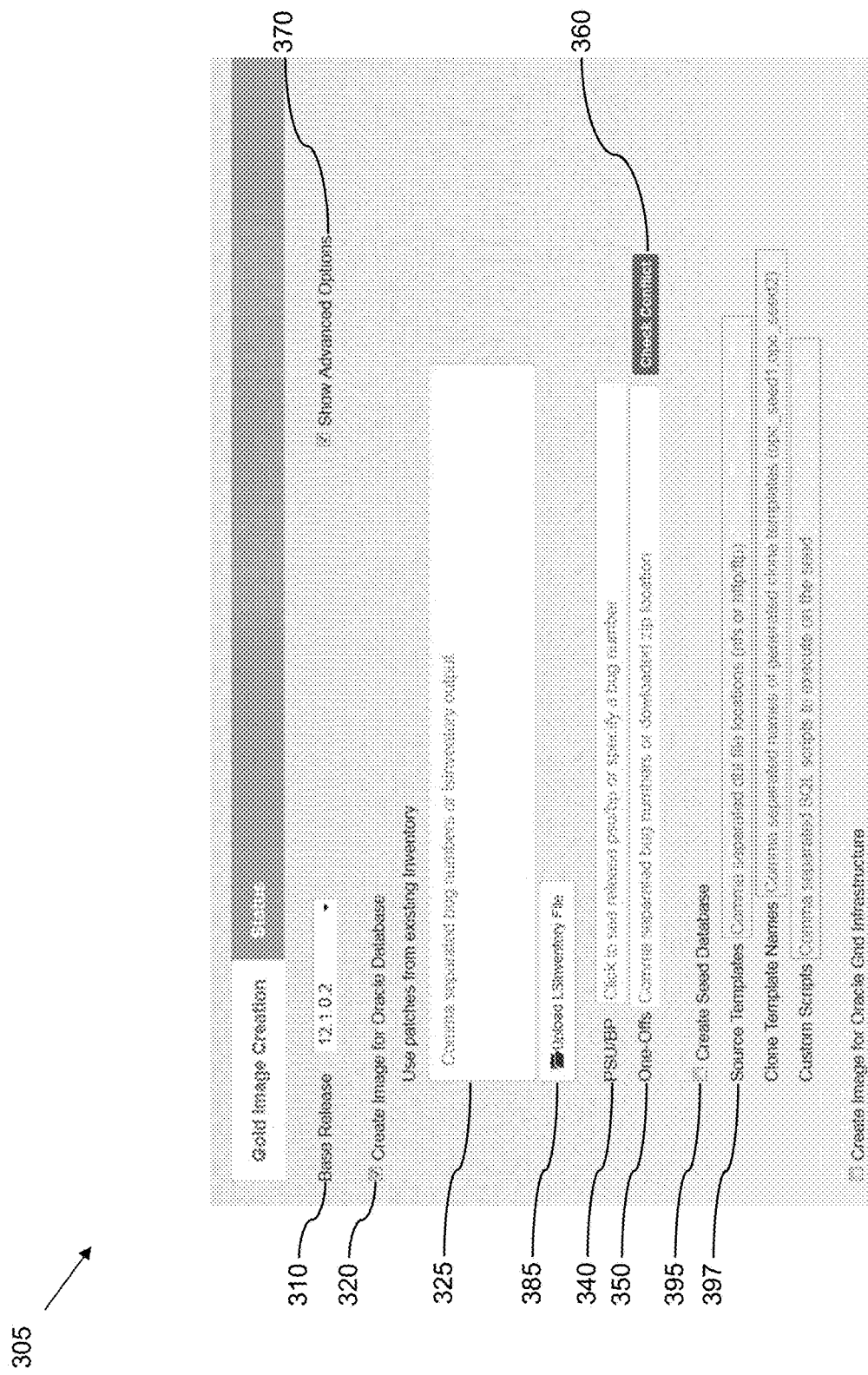

FIGS. 3A-3B illustrate graphical user interfaces for requesting a software image for deployment, according to some embodiments of the disclosure. Graphical user interface (GUI) 300 depicts a GUI screen shot for a user to provide a request for generating a database gold image. Base release 310 is a field for the user to indicate the base release of the database software that the user would like to receive the gold image. Output type 320, depicted as "Gold Image Shape" is the output type or deployment type that is being requested by the user. Output type 320 may include a plurality of output types that a user may select from.

Zip 321 is an output type that zips up a fully tested test image as a gold image for deployment by the user. The zip 321 output types is a zip file that contains the software bits of the test image zipped up into one zip file. A user would be able to download the zip 321 file and unzip the zip 321 file onto a home directory within the user's testing environment to install the requested gold image for the user's internal testing before rolling the tested image into the user's production environment.

Tar 322 output type is a [T]ape [AR]chive (e.g., tar) format. All of the files starting from the home directory of the test image are collected into one archived .tar file for deployment by the user. The tar 322 output type contains the software bits of the test image zipped up into one zip file. A user would be able to download the tar 322 file and extract the files within the tar 322 file onto a home directory within the user's testing environment to install the requested gold image for the user testing.

Docker 323 is another output type that a gold image may be packaged for deployment by a user. Docker is a computer program that performs operating-system-level virtualization also known as containerization. Docker is developed by Docker, Inc. Docker is primarily developed for Linux, where it uses the resource isolation features of the Linux kernel such as cgroups and kernel namespaces, and a union-capable file system such as OverlayFS and others to allow independent "containers" to run within a single Linux instance, avoiding the overhead of starting and maintaining virtual machines (VMs). The Linux kernel's support for namespaces mostly isolates an application's view of the operating environment, including process trees, network, user IDs and mounted file systems, while the kernel's cgroups provide resource limiting for memory and CPU. Docker is a tool that can package an application and its dependencies in a virtual container that can run on any Linux server. This helps enable flexibility and portability on where the application can run, whether on premises, public cloud, private cloud, bare metal, etc. Thus, the Docker 323 output type is a gold image packaged as a docker package that a user may run, whether on premises, public cloud, private cloud, bare metal, etc.

The ova—virtualbox 324, ova—ravello 326, and ova hosted 328 are three examples different types of .ova virtual appliances to be run on cloud infrastructures as-is without any modifications to the virtual machines, network, or storage. Ova—virtualbox 324 is a .ova to be run by an Oracle VM Virtualbox. Ova—ravello 326 is a .ova to be run as VMware or KVM based data center workloads on, as an example, an Oracle Cloud Infrastructure. Ova—hosted 328 is a .ova to be run by, as an example, an Oracle hosted server.

The opc host/OCI-Classic 327 is an output type that is used by a public cloud such as the Oracle Public Cloud/Oracle Cloud Infrastructure (OCI) Classic, developed and managed by Oracle Corporation. The OCI-Classic is an application development platform solution delivered entirely through the Internet from the Oracle Corporation. For example, a software developer may want to develop software using a particular configuration of a database. The application development environment may be set up using the OCI-Classic, where a gold image version of a database may be requested and deployed on the application development environment of the software developer.

The bmc host/OCI 328 is an output type that is used by a bare-metal cloud/Oracle Cloud Infrastructure (OCI). A bare-metal cloud/OCI is a public cloud service providing a public cloud environment in which the user rents hardware resources from a remote service provider. One of the major benefits of OCI is the flexibility it provides. Businesses can customize an OCI to meet their unique requirements and troubleshoot applications without having to worry about neighboring virtual machines (VMs). Public cloud environments are multi-tenant and VMs share the physical server which can result in VMs fighting for resources. Because an OCI is made up of dedicated servers, this problem is avoided. The OCI works well for big data applications or high-transaction workloads that do not tolerate latency. The bmc host/OCI 328 is an output type that is used to run in a bare-metal cloud/OCI environment.

Checkbox 330 is a checkbox for a user to indicate that they would like to create a database image. Upon selection of the checkbox, the GIaaS 115 will be informed of the user's request to generate a gold image of a database having a base release 310, and an output type 320.

PSU/RU input field 340 is an input field for a user to provide one or more RU(s) that the user would like to have included with the base release 310 selected. In some embodiments, the RU(s) entered into PSU/RU input field 340 may indicate the RU(s) used by the user in their current deployment of the database software. In some embodiments, the PSU/RU input field 340 may indicate the RU(s) that have been released for based release 310 of the database software as selected by user.

One-offs input field 350 is an input field for a user to provide one or more one-off patch update identifiers corresponding to one or more patch updates that the user used in the past or is currently using in a current deployment of the database software. In some embodiments, the one-offs input field 350 may include one-off patch update identifiers corresponding to one-off patch updates that are provided to the user from the software vendor. As discussed above, the one-off patch updates are the patch updates provided by the vendor to help fix particular bugs/issues associated to a particular configuration of the database software that may be unique to the particular user.

Check conflict 360 is a button on the GUI 300 that allows the user to request a conflict check of the entered one-off patch update identifiers entered by the user against the base release 310 selected, the gold image output type 320, and the RU(s) (if any).

The show advanced options 370 is a checkbox for the user to select to leverage a few efficiency tools to help improve the GUI interaction between the user and the GIaaS 115 system. Upon checking the show advanced options 370 and clicking the "Submit" button, the GUI navigates to a second page as depicted by FIG. 3B.

FIG. 3B illustrates a second page of a graphical user interfaces for requesting a software image for deployment, according to some embodiments of the disclosure. Text entry box 325 is a large text entry field for a user to input or provide a list of bug numbers or a list of patches (e.g., RUs and/or one-off patch updates) from an existing inventory of patches maintained by, as an example, a DBA of the customer. The existing inventory of patches include the RU(s) and/or the one-off patch update(s) that have been applied to the current production environment. In some embodiments, a tool (e.g., LSinventory, developed by Oracle Corporation) may be used by the DBA of the customer to generate a list of all patches applied to the customer's current deployment of the database software. Once the tool generates the list in the form of, as an example, a text file, the file may be uploaded via the Upload LSinventory File 385 button. Once the list of the existing inventory of patches is uploaded, the text entry box 325 may display all of the RU identifiers and/or the one-off patch update identifiers that corresponds to the customer's existing inventory of patches for the GIaaS to investigate and process. The ability to generate a list of existing patches applied/used in a current database software deployment greatly reduces the amount of manual record keeping of RU(s) and/or one-off patch update(s) applied to an existing deployment of a database software. Furthermore, coupled with the check conflict 360 button that determines if conflicts arise between the one-off patch update(s) and the requested base version 310 and RUs, the amount of time it takes a DBA to generate a gold image for each quarter is greatly reduced.

The PSU/RU input field 340 and the one-offs input field 350 may also be used to enter in existing bug numbers that the user may not have been provided with a RU and/or one-off patch update to fix. As discussed above, the user may click the check conflict 360 button to have the GIaaS 115 check for conflicts between the uploaded one-off patch update(s) and the base release 310 and/or the uploaded RU(s).

As another productivity feature, the create seed database 395 checkbox provides the user with the ability to request for a seed database to be generated, backed up, and delivered with the gold image to be restored during the installation of the gold image. By the user checking the create seed database 395 checkbox, the user must indicate, via source templates input field 397, one or more .dbt file locations having the one or more .dbt files. A .dbt file is a type of template used to create a new database. The .dbt file contains the characteristics of the database to be created (e.g., the structures of the database, the actual tables within the database). Non-seed templates are more flexible than their seeded counterparts (e.g., .dbc) because all data files and online redo log files are created to a user's specification, and names, sizes, and other attributes can be changed as required. A user may create a .dbt file by using a database configuration assistant (DBCA) tool to generate a .dbt file by referring the DBCA tool to any existing database within the user's environment. The DBCA tool will generate a .dbt file that can be used to create another database using the configuration information within the .dbt file.

Figure 4:
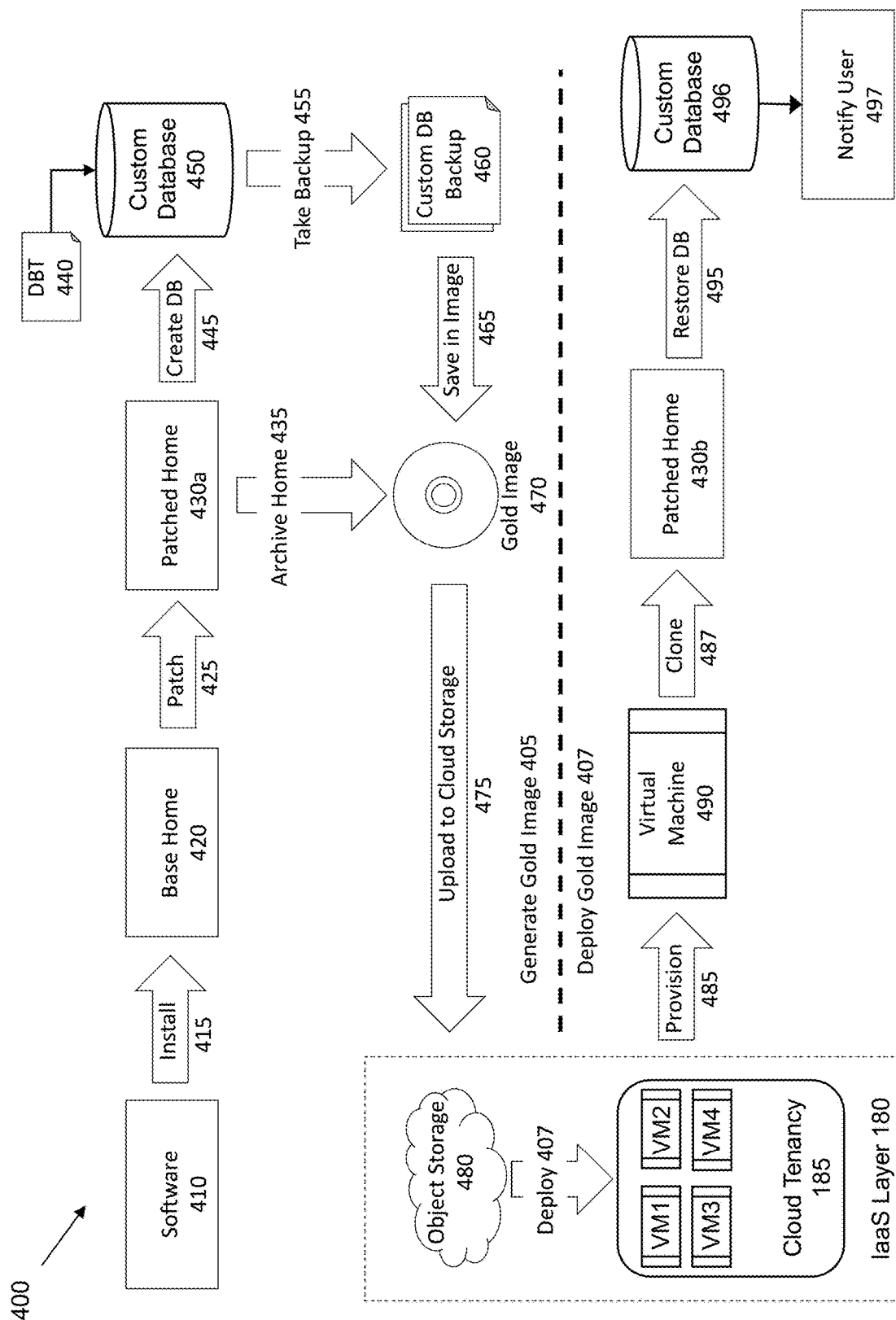
FIG. 4 is a flow chart for generating a software image for deployment in a cloud infrastructure, according to some embodiments of the disclosure.

If the user selects the create seed database 395 checkbox and provide a .dbt file, the GIaaS 115 will generate a database having the configuration as specified by the .dbt file in the test image for testing. Once the testing of the test image is successful, a backup of the database is performed and provided within the gold image so that when the user executes or deploys the gold image at the location of the user's request, not only will the database software be installed, but the database may be restored from the backup of the database. The restore of the database is a much faster method of creating the database than to simply create the database from scratch. For example, it may only take the restore process to generate the database in a matter of minutes versus creating the database from scratch, which may take hours. FIG. 4 provides additional details on the process and methods for creating the gold image including the seed database.

FIG. 4 is a flow chart for generating a software image, according to some embodiments of the disclosure. Method 400 includes the steps and systems to generate a gold image and deploy the gold image in a cloud infrastructure, according to some embodiments of the present disclosure. Method 400 is depicted as having two distinct groups of processing: (a) generating gold image 405 and (b) deploying gold image 407, separated in FIG. 4 by the bolded dash lines. Method 400 is disclosed with references made to various structural elements of FIG. 1 (e.g., IaaS Layer 180 and cloud tenancy 185), FIG. 2 (e.g., step 240), FIGS. 3A-3B, and additional structural elements not previously depicted in other figures.

At 415, the database software 410 is installed onto a base home 420 in an isolated computing environment such as, an example, a container 140 (not shown) from FIG. 1. The database software 410 may comprise a base release database software 310, PSU(s)/RU(s) 340, and one-off patch update(s) 350 (not shown) from FIG. 3. The base home 420 may include is a home directory into which all database software (e.g., from Oracle Corporation) is installed and is referenced by an environment variable. The home directory 420 may include the following: (1) Directory location where the products are installed; (2) Corresponding system path setup; (3) Program groups associated with the products installed in the home (where applicable); and (4) Services running from the home. The home base 420 may also include a base location where the binaries are stored.

At 425, the files within the home base 420 are patched with corresponding RU(s) 340 and/or one-off patch updates 350 to create a patched home 430a. The patched home 430a is the test image created in step 240 of FIG. 2.

At 445, a database 450 is created using a database template (.dbt) file 440. In some embodiments, a generic .dbt 440 is used to create the database for testing purposes if a user did not elect to generate a seed database by checking the create seed database 395 from FIG. 3B. In the current embodiment, the .dbt 440 file is provided by the user to create the custom database 450. By the user providing a .dbt 440 file from the user's current environment, the methods and systems of the present disclosure may test the test image of the database software on a custom database 450 that has the same structures as the user's current environment. Having the custom database 450 available for testing may help to also validate the database software installed as the patched home 430a, especially if one-off patch update(s) 350 are included in the patched home 430a image.

Once testing is completed to ensure the patched home 430a and the custom database 450 are properly operating, the patched home 430a is archived at 435 into Gold Image 470. Additionally, the custom database 450 is backed up at 455 as custom DB backup files 460. The custom DB backup files 460 are also archived and included in the gold image 470. The processing steps of backing up the custom database 450 provides much computing efficiencies when the gold image 470 is deployed. For example, creating a custom database from scratch using (e.g., SQL scripts) or automated programs developed by a customer's DBA(s) may result in hours of computer processing to create the custom database from scratch. However, create the custom database by restoring from the custom DB backup files 460 within the gold image 470 may be completed in minutes versus hours.

At 475, the gold image 470 is uploaded to a cloud storage for future deployment. The gold image 470 may be stored in a cloud-based object storage 480, such as, an example, Oracle Corporation's Object Storage service. The cloud-based object storage 480 is an internet-scale, high-performance storage platform that offers reliable and cost-efficient data durability. The Object Storage service may store an unlimited amount of unstructured data of any content type, including analytic data and rich content, like images and videos. With Object Storage, users may safely and securely store or retrieve data directly from the Internet or from within the cloud platform. Object Storage offers multiple management interfaces that let users easily manage storage at scale. The elasticity of the platform lets users start small and scale seamlessly, without experiencing any degradation in performance or service reliability. Object Storage is a regional service that is not tied to any specific compute instance. Users may access data from anywhere inside or outside the context of a particular cloud infrastructure, as long the users have Internet connectivity and can access one of the Object Storage endpoints.

At 407, the gold image 470 is deployed onto, as an example, a cloud infrastructure having a VM running in a multi-tenant cloud tenancy 185 within, as an example, an IaaS layer 180. One of ordinary skill in the art may appreciate, the gold image 470 may also be deployed onto other types of cloud infrastructures such as, an example, containers running in a multi-instance cloud infrastructure within, an example, a Software as a Service (SaaS) layer (not shown). The gold image 470 may be executed on any type of cloud infrastructure as defined by the output format 320, from FIG. 3A, requested to generate the gold image.

To further disclose steps of deploying the gold image, method 400 continues with provisioning a virtual machine 490 at step 485. One of ordinary skill in the art may appreciate that step 485 may also provision other structural computing components to deploy the gold image 407 such as, an example, a container (not shown) instead of virtual machine 490.

At 487, the virtual machine 490 is cloned to create the patched home 430b (e.g., gold image) having the same files and directory structures as patched home 430a that was archived into gold image 470.

At 495, custom database 496 is created by restoring the custom DB backup files 460 included within the gold image 470 at step 465. Once the virtual machine 490 is set up with the patched home 430b (e.g., gold image), and the custom database 496 has been created/configured, the user is notified at step 497. In some embodiments, the user is notified via a single sign-on (SSO) mechanism. Single sign-on (SSO) is a session and user authentication service that permits a user to use one set of login credentials (e.g., name and password) to access multiple applications. The service authenticates the end user for all the applications the user has been given rights to and eliminates further prompts when the user switches applications during the same session. On the back end, SSO is helpful for logging user activities as well as monitoring user accounts.

Once the user is notified, the user may begin rigorous testing of the database software on the virtual machine 490. Upon completion of the user testing, the user may deploy the virtual machine 490 into production using an out of place deployment technique to greatly reduce the downtime of the database software over other techniques such as, for example, an in-place deployment. For example, to implement an out of place deployment technique, the new gold image may be running in parallel to a user's existing production environment for testing purposes. Once the testing is complete and the new gold image is ready for deployment. Using an out of place deployment, the user may simply bring the production environment down, flip the switch to bring the production environment back up using the new gold image version of the database software instead of the previous version. The amount of downtime for the particular instance of the database software is only the amount of time to shut down and bring back up the database software.

In contrast, an "in place" deployment technique may require the user to bring down the production environment, install the gold image, test the gold image and then bring the production environment back up using the new gold image. The amount of time the database software is down (e.g., offline) is considerably more than the "out of place" deployment technique.

By providing the gold image to a user as a service, many efficiencies and benefits are achieved such as (1) a centralized service to deliver Gold Images; (2) a UNIFORM and COST-EFFECTIVE way to deliver OPTIMIZED software across users; (3) a simple web portal offering Gold Images; (4) a GIaaS that detects conflicts, builds, validates, and optimizes the Gold Images; (5) a service that provides multiple output formats for different deployment infrastructures, such as, for example, tar, zip, docker, ova (Vbox), etc.; (6) a reuse of generated gold images by uploading the gold images to a Cloud Object storage; and (7) a REST-enabled architecture to allow multiple input options for requesting Gold Images via the GIaaS solution. In some embodiments, notifications may be sent to a user upon an image availability. Notifications may also be sent when the build starts to alert users of the status of the GIaaS progress.

What has been disclosed are improved systems, computer program products and methods for generating gold images of database software from a centralized service for deployment by a user. The present disclosure eliminates hours of DBA effort and hours of customer's/user's computing resources in generating gold images of new released database software and/or RU(s) by leveraging a centralized service to deliver the gold images.

System Architecture

Figure 5:
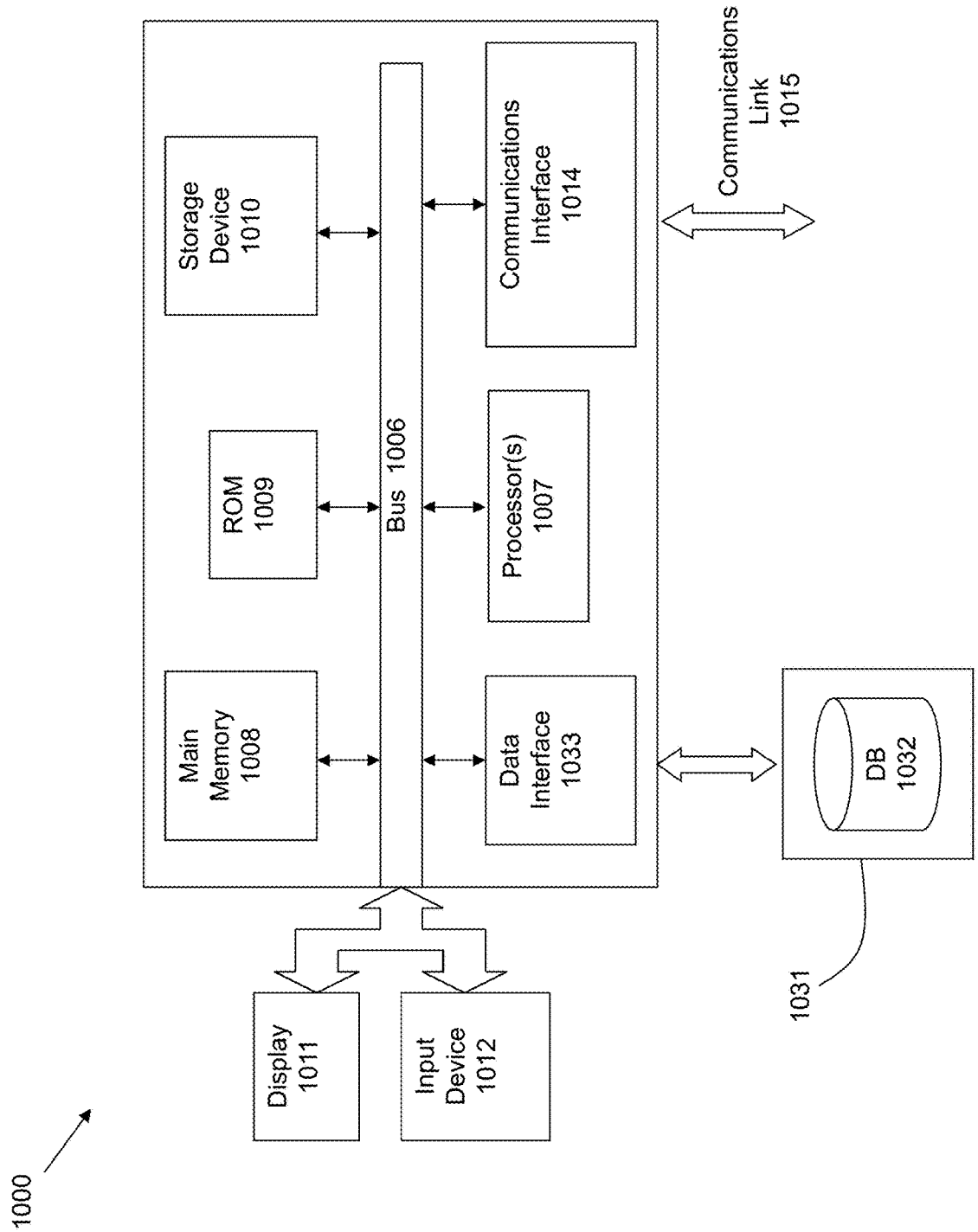
FIG. 5 is a block diagram of a computing system suitable for implementing an embodiment of the present disclosure.

FIG. 5 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 6:
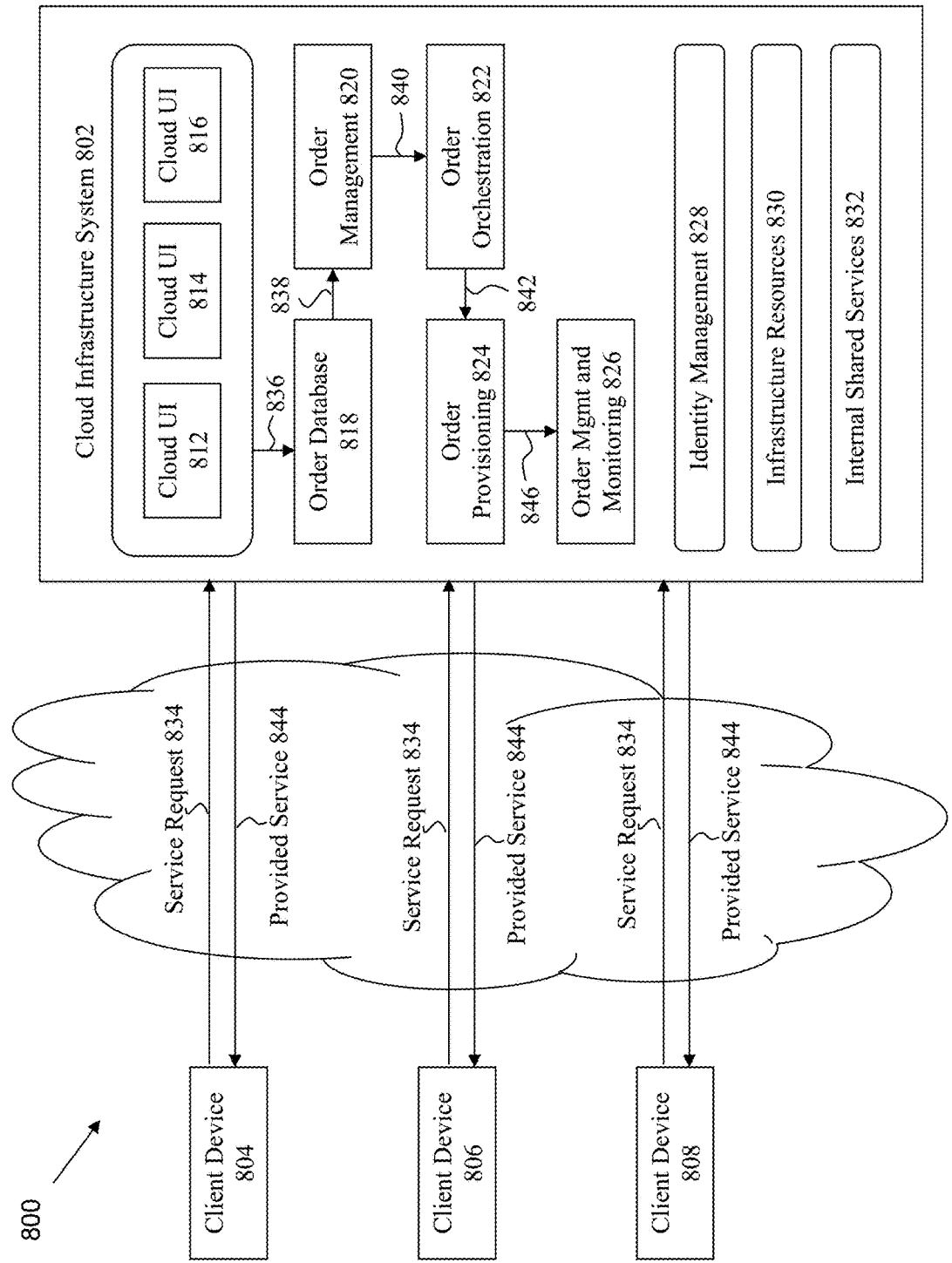
FIG. 6 is a simplified block diagram of one or more components of a system environment by which services provided by one or more components of an embodiment system may be offered as cloud services, according to some embodiments of the disclosure.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer-implemented method for generating a software image as a service for deployment, the method comprising:
   providing, by a vendor, software as a service to customers, the software as a service and underlying infrastructure being managed and controlled by the vendor for access by the customers, the software as a service comprising gold image generation software, wherein the gold image generation software receives a software image request from a customer and provides a gold image in response to the software image request, the software image request comprising a parameter;
   generating a gold image, by the gold image generation software of the software as a service, by:
      identifying a particular version of a software;
      identifying an output format of the software image;
      identifying one or more release update (RU) identifiers corresponding to one or more RUs for the particular version of the software;
      identifying one or more one-off patch update identifiers corresponding to one or more one-off patch updates for the particular version of the software and for the customer;
      determining, via a conflict checker, whether conflicts arise between the one or more one-off patch updates identified by the one or more one-off patch update identifiers, the particular version of the software, and/or the one or more RUs identified by the one or more RU identifiers;
      installing, into a testing environment as a test image at the gold image as a service system, the particular version of the software, the one or more RUs identified by the one or more RU identifiers, and the one or more one-off patch updates identified by the one or more one-off patch identifiers;
      testing the test image; and
      upon successful completion of testing the test image, generating a gold image by transforming the test image into the output format;
   receiving a database template file from the customer;
   generating a custom database using the database template file; and
   storing the custom database in the gold image, wherein the gold image is customer specific.

2. The method of claim 1, wherein the software image represents an upgraded state of the software having customized configurations of a desired version of the software, and desired patches.

3. The method of claim 1, wherein the RU comprises bug fixes and security patches for the software.

4. The method of claim 1, wherein the one or more one-off patch updates are patch updates for particular customers and not for a general customer base.

5. The method of claim 1, wherein the output format is a tar format file.

6. The method of claim 1, further comprising upon determining one or more conflicts arise, resolving the one or more conflicts by:
   retrieving a conflict resolved patch, and
   installing, into the testing environment as the test image, the conflict resolved patch along with at least one of the particular version of the software, the one or more RUs retrieved, and the one or more one-off patch updates retrieved.

7. The method of claim 1, further comprising optimizing the gold image by removing files not used by the customer.

8. The method of claim 1, further comprising implementing a storage repository within an infrastructure as a service (IaaS) layer, the storage repository storing the gold image.

9. The method of claim 1, wherein a previously generated gold image stored in a storage repository is retrieved for delivery upon a subsequent request for a software image having a same request input as a previous request that generated the gold image.

10. The method of claim 1, further comprising identifying a database template, the database template providing a database definition of a structure of an existing database and creating a database in the testing environment based at least in part on the database template, wherein the test image comprises the database.

11. The method of claim 1, wherein the software image is deployed within a virtual machine hosted by a cloud service provider based on the output format.

12. The method of claim 1, further comprising receiving one or more bug numbers corresponding to bugs identified but not yet resolved, the one or more bug numbers corresponding to either an RU or a one-off patch update.

13. The method of claim 1, further comprising storing the output format in a storage repository.

14. The method of claim 13, wherein the storage repository is a cloud object storage.

15. A computer system for generating a software image as a service for deployment, the computer system comprising:
   a computer processor to execute a set of program code instructions; and
   a memory to hold the set of program code instructions, in which the set of program code instructions comprises program code to perform:
      providing, by a vendor, software as a service to customers, the software as a service and underlying infrastructure being managed and controlled by the vendor for access by the customers, the software as a service comprising gold image generation software, wherein the gold image generation software receives a software image request from a customer and provides a gold image in response to the software image request, the software image request comprising a parameter;
      generating a gold image, la the gold image generation software of the software as a service, by:
         identifying a particular version of a software;
         identifying an output format of the software image;
         identifying one or more release update (RU) identifiers corresponding to one or more RUs for the particular version of the software;
         identifying one or more one-off patch update identifiers corresponding to one or more one-off patch updates for the particular version of the software and for the customer;
         determining, via a conflict checker, whether conflicts arise between the one or more one-off patch updates identified by the one or more one-off patch update identifiers, the particular version of the software, and/or the one or more RUs identified by the one or more RU identifiers;
         installing, into a testing environment as a test image at the gold image as a service system, the particular version of the software, the one or more RUs identified by the one or more RU identifiers, and the one or more one-off patch updates identified by the one or more one-off patch identifiers;

testing the test image; and
    upon successful completion of testing the test image, generating a gold image by transforming the test image into the output format;
receiving a database template file from the customer;
generating a custom database using the database template file; and
storing the custom database in the gold image, wherein the gold image is customer specific.

16. The computer system of claim 15, wherein the software image represents an upgraded state of the software having customized configurations of a desired version of the software, and desired patches.

17. The computer system of claim 15, wherein the RU comprises bug fixes and security patches for the software.

18. The computer system of claim 15, wherein the one or more one-off patch updates are patch updates for particular customers and not for a general customer base.

19. The computer system of claim 15, wherein the output format is a tar format file.

20. The computer system of claim 15, wherein the set of program code instructions further comprise program code to perform:
    upon determining one or more conflicts arise, resolving the one or more conflicts by:
      retrieving a conflict resolved patch, and
      installing, into the testing environment as the test image, the conflict resolved patch along with at least one of the particular version of the software, the one or more RUs retrieved, and the one or more one-off patch updates retrieved.

21. The computer system of claim 15, further comprising optimizing the gold image by removing files not used by the customer.

22. The computer system of claim 15, wherein the set of program code instructions further comprise program code to perform:
    implementing a storage repository within an infrastructure as a service (IaaS) layer, the storage repository storing the gold image.

23. The computer system of claim 15, wherein a previously generated gold image stored in a storage repository is retrieved for delivery upon a subsequent request for a software image having a same request input as a previous request that generated the gold image.

24. The computer system of claim 15, wherein the set of program code instructions further comprise program code to perform identifying a database template, the database template providing a database definition of a structure of an existing database and creating a database in the testing environment based at least in part on the database template, wherein the test image comprises the database.

25. The computer system of claim 15, wherein the software image is deployed within a virtual machine hosted by a cloud service provider based on the output format.

26. The computer system of claim 15, wherein the set of program code instructions further comprise program code to perform receiving one or more bug numbers corresponding to bugs identified but not yet resolved, the one or more bug numbers corresponding to either an RU or a one-off patch update.

27. The computer system of claim 15, wherein the set of program code instructions further comprise program code to perform storing the output format in a storage repository.

28. The computer system of claim 27, wherein the storage repository is a cloud object storage.

29. A computer program product embodied in a non-transitory computer readable medium, the computer readable medium having stored thereon a sequence of instructions which, when executed by a processor causes the processor to execute a process to generate a software image as a service for deployment, the process comprising:
    providing, by a vendor, software as a service to customers, the software as a service and underlying infrastructure being managed and controlled by the vendor for access by the customers, the software as a service comprising gold image generation software, wherein the gold image generation software receives a software image request from a customer and provides a gold image in response to the software image request, the software image request comprising a parameter;
    generating a gold image, la the gold image generation software of the software as a service, by:
      identifying a particular version of a software;
      identifying an output format of the software image;
      identifying one or more release update (RU) identifiers corresponding to one or more RUs for the particular version of the software;
      identifying one or more one-off patch update identifiers corresponding to one or more one-off patch updates for the particular version of the software and for the customer;
      determining, via a conflict checker, whether conflicts arise between the one or more one-off patch updates identified by the one or more one-off patch update identifiers, the particular version of the software, and/or the one or more RUs identified by the one or more RU identifiers;
      installing, into a testing environment as a test image at the gold image as a service system, the particular version of the software, the one or more RUs identified by the one or more RU identifiers, and the one or more one-off patch updates identified by the one or more one-off patch identifiers;
      testing the test image; and
      upon successful completion of testing the test image, generating a gold image by transforming the test image into the output format;
    receiving a database template file from the customer;
    generating a custom database using the database template file; and
    storing the custom database in the gold image, wherein the gold image is customer specific.

30. The computer program product of claim 29, wherein the software image represents an upgraded state of the software having customized configurations of a desired version of the software, and desired patches.

31. The computer program product of claim 29, wherein the RU comprises bug fixes and security patches for the software.

32. The computer program product of claim 29, wherein the one or more one-off patch updates are patch updates for particular customers and not for a general customer base.

33. The computer program product of claim 29, wherein the output format is a tar format file.

34. The computer program product of claim 29, wherein the process further comprises upon determining one or more conflicts arise, resolving the one or more conflicts by:
    retrieving a conflict resolved patch, and
    installing, into the testing environment as the test image, the conflict resolved patch along with at least one of the particular version of the software, the one or more RUs retrieved, and the one or more one-off patch updates retrieved.

35. The computer program product of claim 29, further comprising optimizing the gold image by removing files not used by the customer.

36. The computer program product of claim 29, wherein the process further comprises implementing a storage repository within an infrastructure as a service (IaaS) layer, the storage repository storing the gold image.

37. The computer program product of claim 29, wherein a previously generated gold image stored in a storage repository is retrieved for delivery upon a subsequent request for a software image having a same request input as a previous request that generated the gold image.

38. The computer program product of claim 29, wherein the process further comprises identifying a database template, the database template providing a database definition of a structure of an existing database and creating a database in the testing environment based at least in part on the database template, wherein the test image comprises the database.

39. The computer program product of claim 29, wherein the software image is deployed within a virtual machine hosted by a cloud service provider based on the output format.

40. The computer program product of claim 29, wherein the process further comprises receiving one or more bug numbers corresponding to bugs identified but not yet resolved, the one or more bug numbers corresponding to either an RU or a one-off patch update.

41. The computer program product of claim 29, wherein the process further comprises storing the output format in a storage repository.

42. The computer program product of claim 41, wherein the storage repository is a cloud object storage.

* * * * *

UNITED STATES PATENT AND TRADEMARK OFFICE
CERTIFICATE OF CORRECTION

PATENT NO. : 10,732,960 B2  
APPLICATION NO. : 16/166029  
DATED : August 4, 2020  
INVENTOR(S) : Kannan et al.

Page 1 of 1

It is certified that error appears in the above-identified patent and that said Letters Patent is hereby corrected as shown below:

On the Title Page

Column 1, item (73) under Assignee, Line 1, delete "INTERNATONAL" and insert -- INTERNATIONAL --, therefor.

In the Specification

In Column 20, Line 26, delete "PTSN," and insert -- PSTN, --, therefor.

In the Claims

In Column 26, Line 45, in Claim 15, delete "la" and insert -- by --, therefor.

In Column 28, Line 17, in Claim 29, delete "la" and insert -- by --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*